United States Patent [19]

Newell et al.

[11] Patent Number: 5,644,083
[45] Date of Patent: Jul. 1, 1997

[54] ACCELEROMETER AND METHOD OF MANUFACTURE

[75] Inventors: G. Richard Newell, Alamo; Kenneth S. Lewallen, Concord; Scott D. Orlosky, San Anselmo; Bert D. Egley, Walnut Creek, all of Calif.

[73] Assignee: New SD, Inc., Concord, Calif.

[21] Appl. No.: 588,899

[22] Filed: Jan. 19, 1996

Related U.S. Application Data

[63] Continuation of Ser. No. 267,670, Jun. 29, 1994, abandoned.
[51] Int. Cl.⁶ .................................................. G01P 15/09
[52] U.S. Cl. ........................ 73/514.34; 73/514.37; 73/514.13; 73/514.23
[58] Field of Search ........................ 73/514.34, 514.13, 73/514.23, 514.37

[56] References Cited

U.S. PATENT DOCUMENTS

| | | | |
|---|---|---|---|
| 4,182,187 | 1/1980 | Hanson | 73/497 |
| 4,250,757 | 2/1981 | Hanson | 73/514.23 |
| 4,479,385 | 10/1984 | Koehler | 73/517 R |
| 4,766,768 | 8/1988 | Norling et al. | 73/497 |
| 4,872,342 | 10/1989 | Hanson et al. | 73/517 R |
| 4,881,408 | 11/1989 | Hulsing, II et al. | 73/517 AV |
| 5,005,413 | 4/1991 | Novack et al. | 73/517 AV |
| 5,036,715 | 8/1991 | Hanson | 73/862.59 |
| 5,085,079 | 2/1992 | Holdren et al. | 73/517 B |
| 5,090,243 | 2/1992 | Holdren et al. | 73/514.23 |
| 5,130,937 | 7/1992 | Kumar et al. | 364/565 |
| 5,165,279 | 11/1992 | Norling et al. | 73/517 AV |
| 5,289,719 | 3/1994 | Egley et al. | 73/497 |
| 5,315,874 | 5/1994 | Petrovich et al. | 73/493 |

FOREIGN PATENT DOCUMENTS 507338  10/1992  European Pat. Off. .

OTHER PUBLICATIONS

European Search Report dated Nov. 2, 1995, 3 pages, citing references listed herein.

*Primary Examiner*—Hezron E. Williams
*Assistant Examiner*—Richard A. Moller
*Attorney, Agent, or Firm*—Flehr Hohbach Test Albritton & Herbert LLP

[57] ABSTRACT

Accelerometer and method in which parts such as the seismic mass and force sensors are all fabricated of a single material such as crystalline quartz and bonded together in a manner which reduces the possibility of creep between them. Damping plates and squeeze film gas damping dampen movement of the seismic mass, and the parts are oriented in a predetermined manner relative to the crystallographic axes of the wafers from which they are fabricated to control the character of breakaway tabs which hold the parts to the wafers during fabrication.

21 Claims, 5 Drawing Sheets

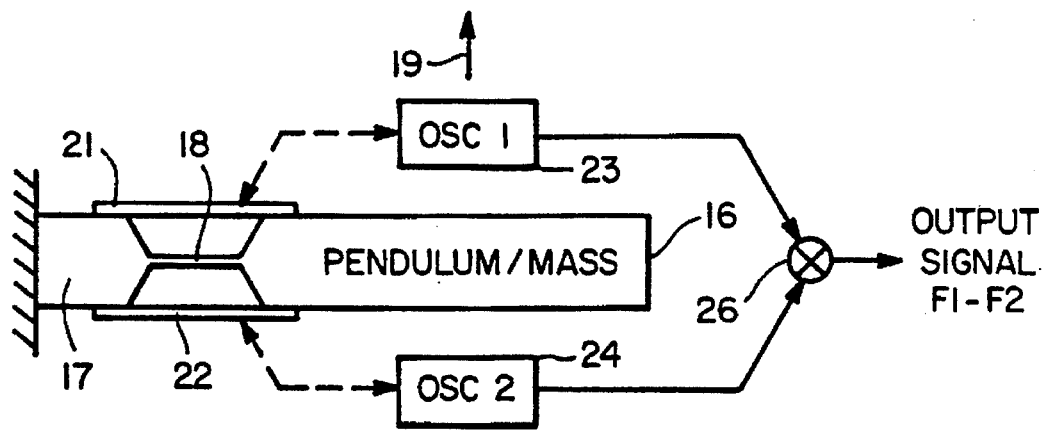
FIG_1
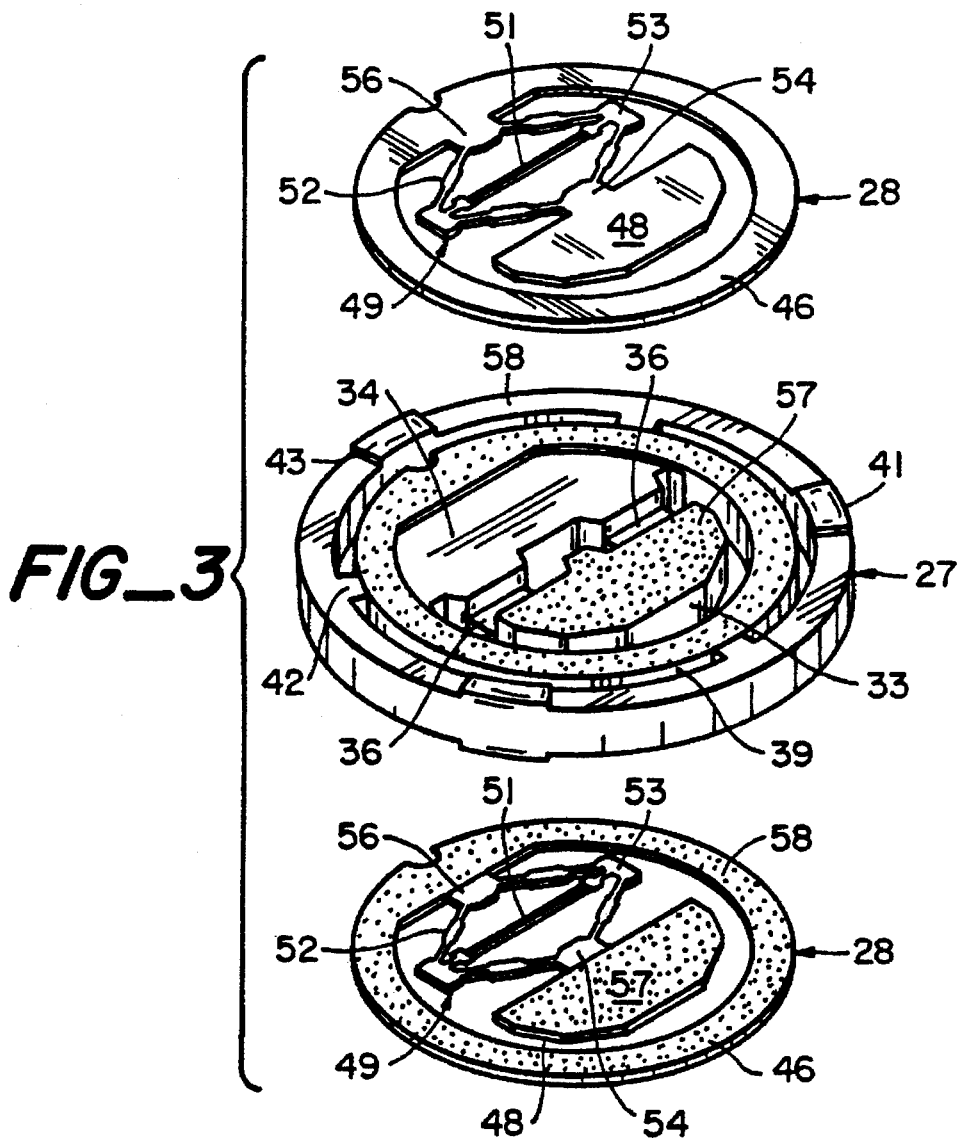
FIG_3

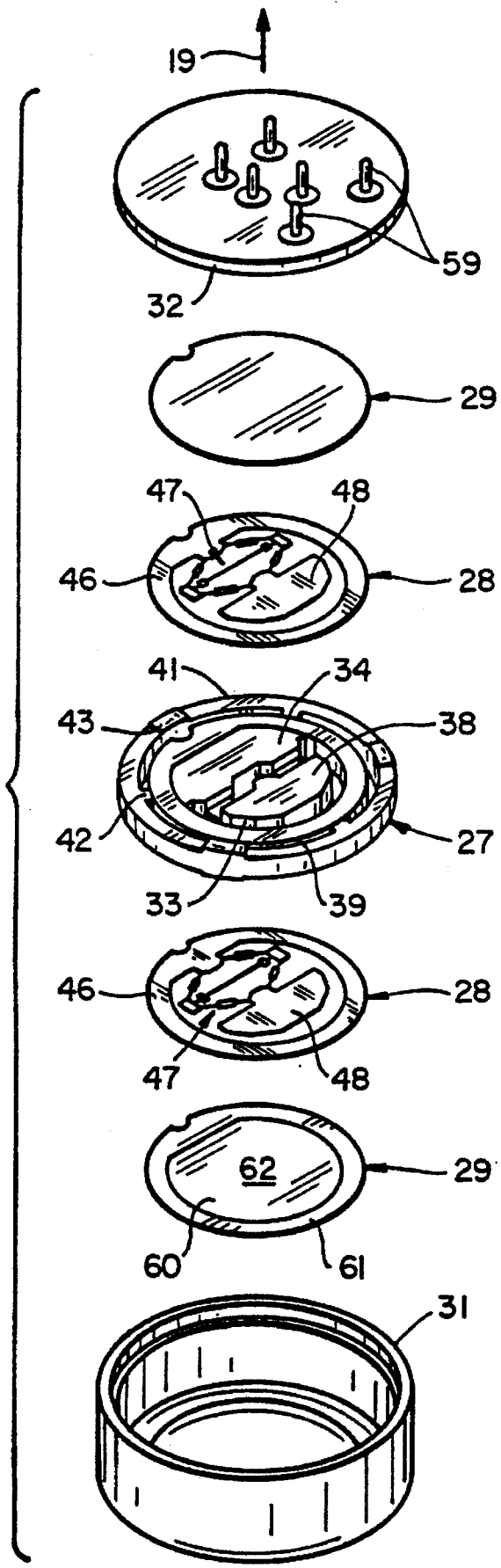

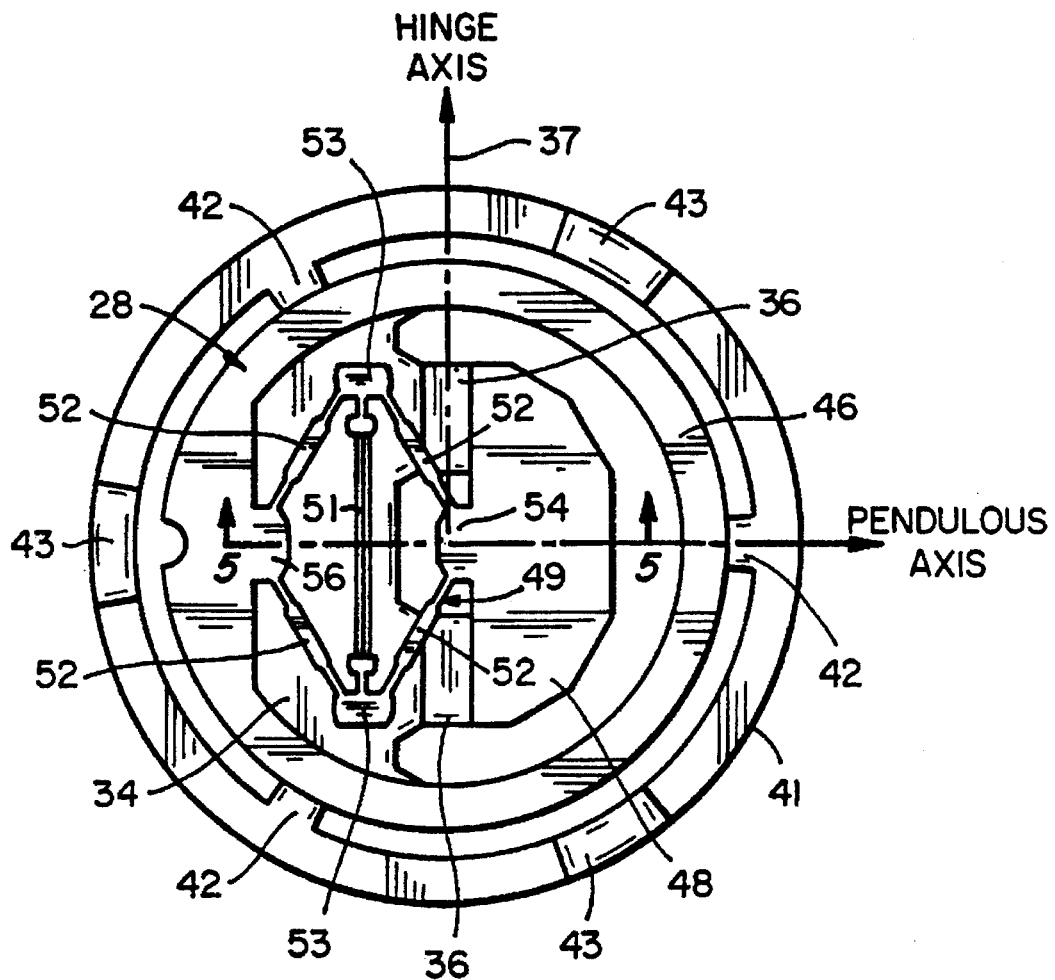
FIG_4
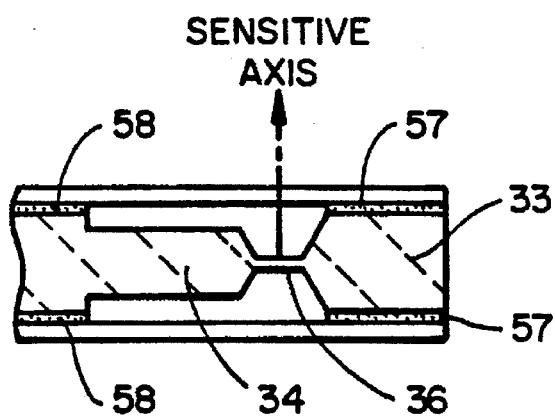
FIG_5

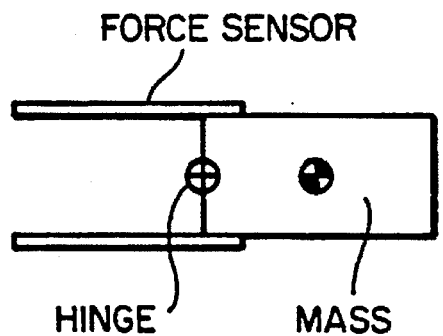
FIG_6a
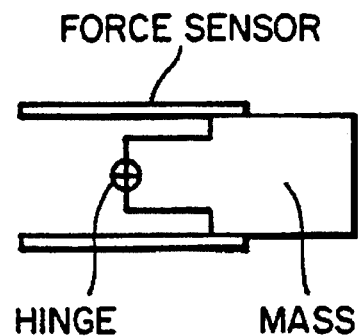
FIG_7a
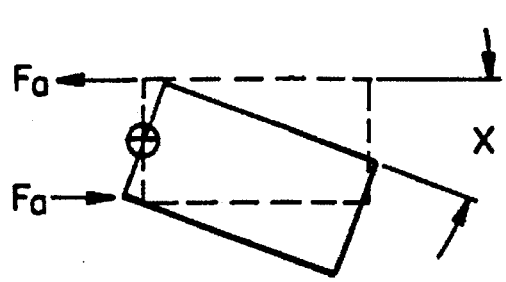
FIG_6b
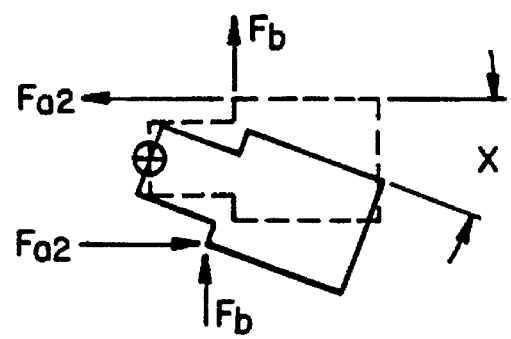
FIG_7b
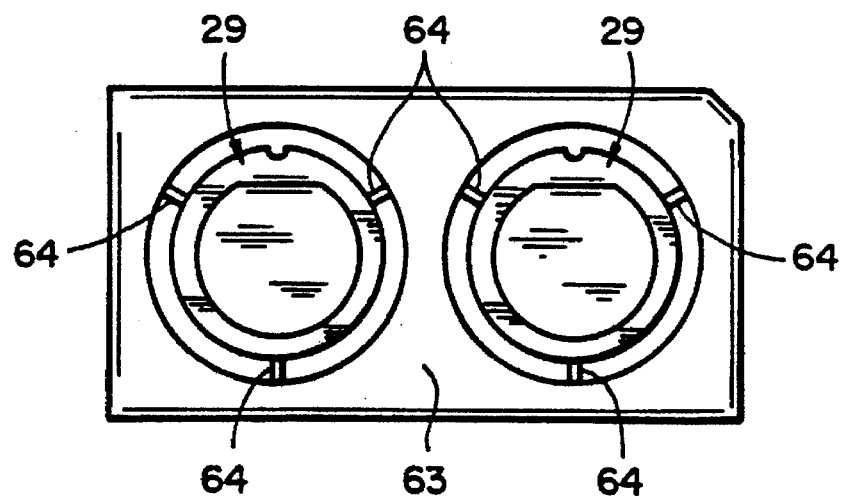
FIG_8

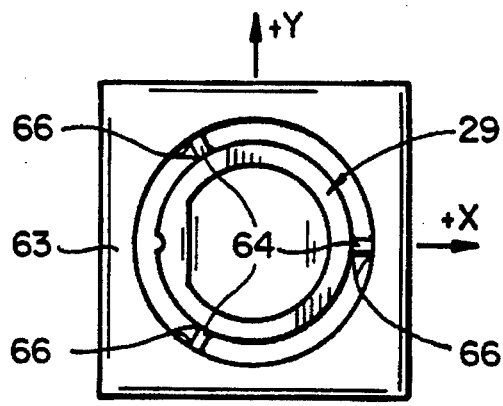
FIG_9
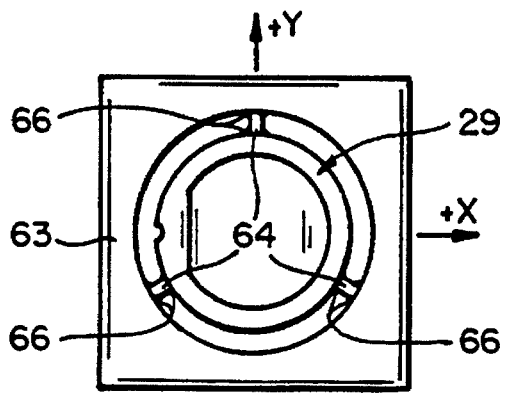
FIG_10
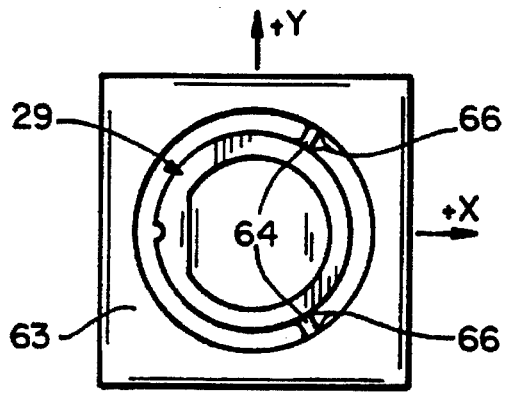
FIG_11
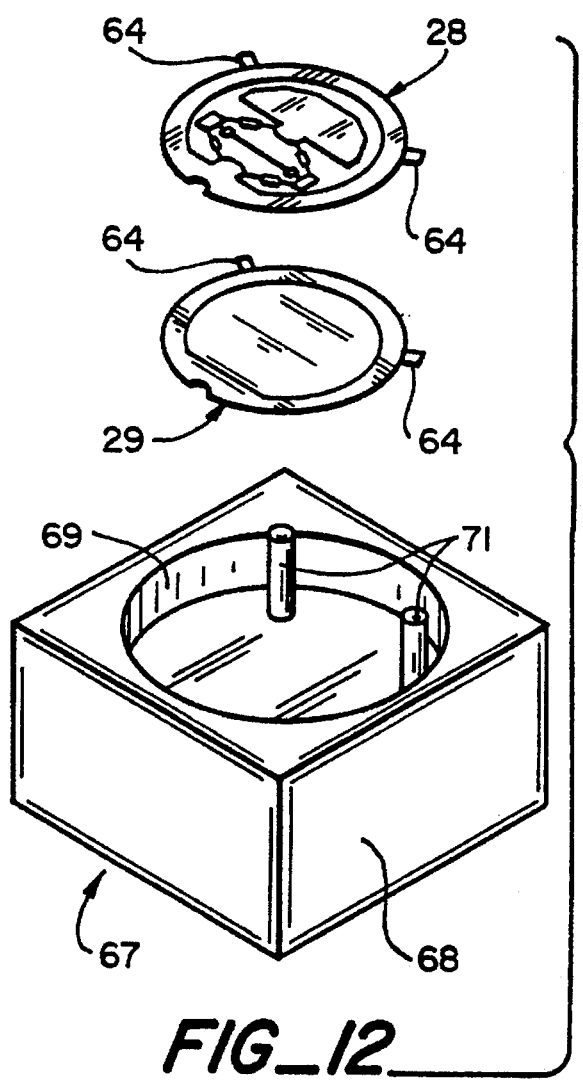
FIG_12

ACCELEROMETER AND METHOD OF MANUFACTURE

This is a continuation of application Ser. No. 08/267,670 filed Jun. 29, 1994 now abandoned.

This invention pertains generally to accelerometers and, more particularly, to a proofmass accelerometer and method of manufacturing the same.

Proofmass accelerometers generally have a seismic mass which is supported by one or more flexures for pendulous movement along a sensitive axis. This motion is restrained by one or more force sensing elements which have a frequency that changes with applied load. When an acceleration is applied along the sensitive axis, the force sensing element is loaded, and its frequency changes. This frequency change is a measure of acceleration.

It is common in this type of accelerometer to use two force sensing elements attached to opposite sides of the mass in a push-pull arrangement. In this design, an acceleration will increase the frequency of one element and decrease the frequency of the other. The measure of acceleration is then a function of the difference in frequency of the two force sensing elements. A number of factors which might otherwise result in errors, such as changes in temperature, cause both frequencies to change in the same direction and are rejected by taking the difference in frequency.

One of the most critical features in this type of accelerometer is the manner in which the force sensing element is connected to the mass. Any creep in the bonding material which attaches the force sensing elements to the mass can appear as an acceleration.

It is in general an object of the invention to provide a new and improved accelerometer and method of manufacturing the same.

Another object of the invention is to provide an accelerometer and method of the above character which overcome limitations and disadvantages of accelerometers heretofore provided.

These and other objects are achieved in accordance with the invention by providing an accelerometer and method in which parts such as the seismic mass and force sensors are all fabricated of a single material such as crystalline quartz and bonded together in a manner which reduces the possibility of creep between them. Damping plates and squeeze film gas damping dampen movement of the seismic mass, and the parts are oriented in a predetermined manner relative to the crystallographic axes of the wafers from which they are fabricated to control the character of breakaway tabs which hold the parts to the wafers during fabrication.

FIG. 1 is a block diagram of a proofmass accelerometer of the type to which the invention relates.

FIG. 2 is an exploded isometric view of one embodiment of an accelerometer according to the invention.

FIG. 3 is an enlarged exploded view of certain parts in the embodiment of FIG. 2.

FIG. 4 is a top plan view of the parts of FIG. 3 assembled together.

FIG. 5 is a cross-sectional view taken along line 5—5 in FIG. 4.

FIG. 6a is a schematic representation of the portion of the accelerometer shown in FIG. 5.

FIG. 6b is a vector diagram illustrating the application of forces to the force sensors in the embodiment of FIG. 6a.

FIG. 7a is a schematic representation of the portion of another accelerometer.

FIG. 7b is a vector diagram illustrating the application of forces to the force sensors in the accelerometer of FIG. 7a.

FIG. 8 is top plan view of a wafer from which damping plates are being fabricated for use in the embodiment of FIG. 2.

FIGS. 9–11 are top plan views of wafers from which damping plates for use in the embodiment of FIG. 2 are being fabricated with different orientations relative to the crystallographic axes of the wafers.

FIG. 12 is an exploded isometric view illustrating the use of a tool in the assembly of an accelerometer in accordance with the invention.

As illustrated in FIG. 1, the accelerometer has a mass or pendulum 16 mounted to a support 17 by a flexure 18 for pendulous movement along a sensitive axis 19. A pair of force sensing crystals 21, 22 connected between the mass and support vibrate at frequencies corresponding to the loads applied thereto. The crystals control the frequencies of oscillators 23, 24, and signals from the oscillators are applied to a summation circuit 26 which provides an output signal corresponding to the difference in frequency between the two oscillator signals.

In the embodiment of FIG. 2, the accelerometer is constructed in the form of five disc-like elements stacked together along the sensitive axis. These elements are all fabricated of a material such as crystalline quartz and include a central element 27, a pair of transducer elements 28 on opposite sides of the central element, and a pair of damping elements or lids 29 on the outer sides of the transducer elements. The assembled elements are mounted within a hermetically sealed housing consisting of a base section 31 and a cover 32.

Central element 27 is formed to include a seismic mass 33 which is hingedly mounted to a support block 34 by a pair of flexures 36 for pendulous movement about a hinge axis 37 which extends in a direction perpendicular to the sensitive axis. The seismic mass and the support block each have a generally semicircular configuration in plan view, with the seismic mass having relatively large major surfaces 38 on opposite sides thereof facing in the direction of the sensitive axis.

Seismic mass 33 and support block 34 are disposed within a mounting ring 39 to which the support block is affixed. An isolation ring 41 is disposed concentrically about the mounting ring, with flexible radially extending arms 42 connecting the mounting ring to the isolation ring. Mounting feet 43 extend in an axial direction from opposite faces of the isolation ring. The flexible arms and the rings provide mechanical isolation between the mass and the mounting feet.

The central element is formed as a unitary structure, with the mass, flexures, support block, rings, flexible arms and mounting feet being formed by etching from a wafer of material such as crystalline quartz.

Each of the transducer elements 28 has a mounting ring 46 within which a force sensing crystal 47 and a coupling plate 48 are disposed. The force sensor is a framed double ended tuning fork of the type shown in U.S. Pat. No. 4,970,903. This structure includes a quadrilateral frame 49 with a pair of vibrating tines 51 extending between opposing corners thereof. The frame consists of four links 52, with end pieces 53 at the corners to which the tines are connected and pads 54, 56 at the intermediate corners. Pad 34 is formed integrally with and projects from coupling plate 48, and pad 56 is formed integrally with and projects inwardly from mounting ring 46.

Coupling plate 48 has generally planar surfaces areas on opposite sides thereof which are coextensive with the major surfaces 38 of seismic mass 33. Those surface areas are bonded to the major surfaces by an adhesive 57, and the mounting rings 46 of the transducer elements are bonded to the opposing faces of the mounting ring 39 of the mass element by an adhesive 56. Alternatively, the elements can be bonded together by any other suitable means such as brazing or fritting. The relatively large bonding areas between the mass and the plates is important in that it reduces the chances of creep between the parts. When bonded to the mass, the plates become part of the proofmass.

Each of the transducer elements 28 is formed as a unitary structure, with the ring, force sensor and coupling plate being formed by etching from a wafer of the same material as the mass assembly. By using a single material for both elements, the joints between the elements are unaffected by changes in temperature, which would be a problem if materials having different coefficients of thermal expansion were used. Even greater uniformity and matching of temperature coefficients can be obtained by etching the different elements from the same wafer.

Electrical connections to the force sensing crystals are made by means of leads (not shown) connected to contact pins 59 on the cover 32 of the housing.

As best seen in FIGS. 4–5, the pads 54 which connect the coupling plates to the force sensing crystals are positioned directly above and below the center of the flexures along the sensing axis. This location of the coupling point maximizes the loading on the force sensors from an input acceleration as can be seen by comparing the arrangements shown in FIGS. 6a–6b and 7a–7b.

The arrangement shown in FIG. 6a corresponds to the embodiment of FIG. 2 in which the coupling points between the mass and the force sensors are located directly above the hinge axis. With this arrangement, rotation of the mass through an angle x about the hinge axis causes equal but opposite forces $F_a$ to be applied to the two force sensors.

In the arrangement of FIG. 7a, the coupling points are displaced laterally from the hinge axis, and rotation of the mass about the hinge axis produces a bending moment, with force components $F_{a2}$ applied to the force sensors and components $F_b$ perpendicular to the sensors. Components $F_{a2}$ are smaller than components $F_a$, and components $F_b$ produce an undesirable side loading of the sensors.

Damping plates or lids 29 comprise generally circular plates having recessed areas 60 formed on one side thereof. These plates are formed by etching from the same material as the mass assembly and the transducer assemblies. The recessed areas face the transducer elements, and the outer margins 61 of the plates are bonded to the mounting rings 46 of the transducer elements by suitable means such as an adhesive, braze or fri.

Each of the recessed areas is approximately 1 mil in depth, and a gas film is formed between the outer surface of the transducer plate and the bottom wall 62 of the recess. The bottom walls serve as overrange stops for the seismic mass, and the gas film is compressed to dampen the movement of the mass. This type of damping is sometimes referred to as squeeze film gas damping, and the spaces between the transducer plates and the bottom walls are referred to as squeeze film damping gaps.

The vibration performance of the accelerometer can be optimized by controlling the damping gaps, and it is highly desirable to have precise gaps of equal size on both sides of the mass so that under vibration the mass will remain in a neutral position. In one presently preferred method of fabrication, uniformity is assured by etching a pair of damping plates 29 simultaneously from a common wafer 63, as illustrated in FIG. 8. This pair is then used in the same accelerometer.

The damping plates and other crystalline parts are held in position in the wafers during fabrication by breakout tabs 64.

These tabs extend radially and are spaced about the circumference of the parts. When the fabrication process is complete, the parts are separated from the wafers by breaking the tabs. The tabs need to be small enough so that they can be easily broken without damaging the delicate parts, yet robust enough to hold the parts during the processing steps.

Crystalline quartz can form facets 66 in the corners of parts etched from it. It is extremely difficult to control these facets; they tend to be non-uniform and to vary from part to part. The size of the facets is related to the angle of orientation of a corner relative to the crystalline axes, and it has been found that by placing the tabs at certain angles relative to the axes, the tabs are more uniform and less affected by the formation of facets.

In particular, it has been found that when one of three tabs spaced equally about a damping plate is aligned with the +x crystallographic axis, as illustrated in FIG. 9, the facets between the tabs and the body of the part are minimized. When this part is removed from the wafer, the tabs will break more cleanly from the edge portions of the part.

When one of the three tabs is aligned with the +y axis, as illustrated in FIG. 10, relatively large facets 66 tend to form at both ends of the tabs, and the tabs will not separate cleanly from the part because of these facets.

FIG. 11 shows another orientation which produces relatively large facets on the tabs. In this orientation, one tab is spaced 60° above the +x axis, and a second tab is spaced 60° below it. When this part is removed from the wafer, the two tabs will project from it. These tabs are usually undesirable, but they can be utilized in orienting the parts during assembly of the accelerometer.

FIG. 12 illustrates a tool 67 which can be utilized in assembling the parts together in the manufacture of the transducer. This tool comprises a block 68 in which a cavity 69 is formed. The cavity is generally circular in horizontal section and slightly larger in diameter than central element 27. A pair of alignment pins 71 extend vertically toward one side of the cavity for engagement with locating elements such as tabs 64 on the parts to assure proper orientation and alignment of the parts.

In one preferred method of manufacture, one of the damping plates 29 is placed in the cavity of the alignment tool, with its recessed area facing in an upward direction and its tabs engaging the alignment pins. A transducer element 28 is placed on top of the damping plate, and a mass element 27 is placed on top of the transducer element. A second transducer element 28 is placed on top of the mass element, and a second damping plate is placed on top of the second transducer element, with its recessed area facing in a downward direction. As each successive part is placed in the tool, its tabs are aligned with the alignment pins, and an adhesive is place between that part and the part below it. When all of the parts are bonded together, the assembly is removed from the cavity and mounted in housing body 31. The electrical leads from the force sensors are connected to pins 59, and cover 32 is attached to the body to seal the housing.

It is apparent from the foregoing that a new and improved accelerometer and method of manufacturing the same have been provided. While only certain presently preferred embodiments have been described in detail, as will be apparent to those familiar with the art, certain changes and modifications can be made without departing from the scope of the invention as defined by the following claims.

We claim:

1. In an accelerometer for measuring acceleration along a sensitive axis:
   (a) a support fabricated of a piezoelectric material;
   (b) a generally planar seismic mass fabricated of the same piezoelectric material as the support disposed in a plane substantially perpendicular to the sensitive axis and having axially facing major surfaces on opposite sides thereof;

(c) mounting means fabricated of the same piezoelectric material as the support and the seismic mass connecting the seismic mass to the support for movement about a hinge axis which is perpendicular to the sensitive axis and approximately midway between the major surfaces of the seismic mass; and (d) a pair of generally planar force transducers fabricated of the same piezoelectric material as the support and the seismic mass spaced equally from the hinge axis on opposite sides of the seismic mass in planes perpendicular to the sensitive axis and connected to the seismic mass in such manner that movement of the seismic mass about the hinge axis causes substantially equal and opposite forces to be applied to the two force transducers.

2. The accelerometer of claim 1 wherein the support, the seismic mass and the force transducers are fabricated of crystalline quartz.

3. The accelerometer of claim 1 wherein the support, the seismic mass and the mounting means are formed as a single integral part.

4. The accelerometer of claim 3 wherein the single part includes means for isolating the support from external mounting strains.

5. The accelerometer of claim 1 wherein each of the force transducers is a framed double ended tuning fork.

6. The accelerometer of claim 1 wherein the force transducers are connected to the seismic mass along lines which are parallel to and spaced equally from the hinge axis.

7. The accelerometer of claim 1 wherein the hinge axis intersects the sensitive axis.

8. In an accelerometer for measuring acceleration along a sensitive axis:

(a) a support;

(b) a generally planar seismic mass having major surfaces on opposite sides thereof perpendicular to the sensitive axis;

(c) mounting means connecting the seismic mass to the support for movement about a hinge axis which is perpendicular to the sensitive axis and spaced midway between the major surfaces;

(d) transducer means connected to the seismic mass for response to movement of the seismic mass about the hinge axis; and (e) a pair of damping plates disposed symmetrically on opposite sides of the seismic mass in proximity to the major surfaces of the seismic mass with a film of gas which is compressed between each of the damping plates and a corresponding one of the major surfaces to dampen the movement of the seismic mass.

9. The accelerometer of claim 8 wherein the support, the seismic mass, the transducer means, and the damping plates are all fabricated of the same material.

10. The accelerometer of claim 4 wherein the support, the seismic mass, the transducer means and the damping plates are all fabricated of crystalline quartz.

11. The accelerometer of claim 8 wherein the damping plates have recessed areas of substantially equal size in which the gas is compressed.

12. The accelerometer of claim 8 wherein the transducer means comprises a pair of force transducers disposed symmetrically with respect to the seismic mass and the hinge axis.

13. In an accelerometer for measuring acceleration along a sensitive axis:

(a) a generally planar central element formed to include a support, a seismic mass with relative large major surfaces perpendicular to the sensitive axis, and means mounting the seismic mass to the support for movement about a hinge axis perpendicular to the sensitive axis;

(b) a pair of generally planar transducer elements positioned on opposite sides of the central element and being formed to include force sensors, and plates having surface areas coextensive with and bonded to the major surfaces of the seismic mass for applying forces to the sensors in response to movement of the seismic mass; and (c) damping plates adjacent to the transducer elements with films of gas which are compressed between the damping plates and the transducer plates to dampen the movement of the seismic mass.

14. The accelerometer of claim 13 wherein the central element, the transducer elements and the damping plates are all fabricated of crystalline quartz.

15. The accelerometer of claim 13 wherein the force sensors are framed double ended tuning forks.

16. The accelerometer of claim 13 wherein the damping plates have recessed areas of substantially equal size in which the gas is compressed.

17. The accelerometer of claim 13 wherein the hinge axis intersects the sensitive axis, and the plates of the transducer elements are connected to the force sensors along lines which are parallel to the hinge axis and which also intersect the sensitive axis.

18. The accelerometer of claim 13 wherein the support includes a mounting ring, a semicircular mounting block within the ring to which the seismic mass is attached, an isolation ring disposed concentrically about the mounting ring, and a plurality of radially extending arms interconnecting the mounting ring and the isolation ring.

19. The accelerometer of claim 18 wherein the transducer elements include peripheral mounting rings which are bonded to the mounting ring of the central element.

20. The accelerometer of claim 18 including a plurality of mounting feet extending axially from the isolation ring.

21. In an accelerometer for measuring acceleration along a sensitive axis:

(a) a generally planar support disposed in a plane substantially perpendicular to the sensitive axis and comprising a mounting ring, a semicircular mounting block affixed to and disposed within the mounting ring, an isolation ring disposed concentrically about the mounting ring, and a plurality of radially extending arms interconnecting the mounting ring and the isolation ring;

(b) a generally planar seismic mass disposed within the mounting ring and having axially facing major surfaces on opposite sides thereof;

(c) flexure means connecting the seismic mass to the mounting block support for movement about a hinge axis which is perpendicular to the sensitive axis and positioned approximately midway between the major surfaces of the seismic mass; and (d) a pair of generally planar transducer elements disposed on opposite sides of seismic mass in planes perpendicular to the sensitive axis, each of the transducer elements including a force sensor, and a plate having a surface area coextensive with and bonded to one of the major surfaces of the seismic mass for applying a force to the sensor in response to movement of the seismic mass.

* * * * *